(12) United States Patent
Evans

(10) Patent No.: US 6,662,460 B2
(45) Date of Patent: Dec. 16, 2003

(54) FOLDING CARPENTER'S SQUARE, BEVEL, AND SLIDING BEVEL

(76) Inventor: Christian C. Evans, 330 Hawkes Lake La., Whitefish, MT (US) 59937

(*) Notice: Subject to any disclaimer, the term of this patent is extended or adjusted under 35 U.S.C. 154(b) by 0 days.

(21) Appl. No.: 10/205,071

(22) Filed: Jul. 24, 2002

(65) Prior Publication Data

US 2003/0041467 A1 Mar. 6, 2003

Related U.S. Application Data

(60) Provisional application No. 60/316,869, filed on Sep. 4, 2001.

(51) Int. Cl.[7] ............................................. B43L 7/10
(52) U.S. Cl. ........................... 33/460; 33/463; 33/500
(58) Field of Search .......................... 33/415, 416, 417, 33/418, 419, 420, 423, 452, 456, 458, 459, 460, 463, 464, 465, 469, 472, 473, 478, 495, 496, 497, 498, 499, 500

(56) References Cited

U.S. PATENT DOCUMENTS

| | | | | |
|---|---|---|---|---|
| 228,027 A | | 5/1880 | Bissell | |
| 266,646 A | | 10/1882 | Rossman | |
| 453,890 A | * | 6/1891 | Oerlein | 33/465 |
| 551,839 A | * | 12/1895 | Rogers et al. | 33/499 |
| 622,569 A | | 4/1899 | Namee | |
| 738,224 A | | 9/1903 | Morse | |
| 776,996 A | * | 12/1904 | Buhmeier | 33/478 |
| 912,605 A | | 2/1909 | Osmonson | |
| 964,246 A | | 7/1910 | Hagan | |
| 1,014,402 A | | 1/1912 | Larsen | |
| 1,106,205 A | * | 8/1914 | Grundstrom | 33/420 |
| 1,252,328 A | * | 1/1918 | Dawson | 33/419 |
| 1,370,605 A | * | 3/1921 | Magill | 33/423 |
| 1,473,860 A | | 11/1923 | Mullarkey | |
| 1,514,323 A | | 11/1924 | Kirchner | |

(List continued on next page.)

*Primary Examiner*—Diego Gutierrez
*Assistant Examiner*—R. Alexander Smith
(74) *Attorney, Agent, or Firm*—Kathleen T. Petrich

(57) ABSTRACT

A combination carpenter square and bevel/sliding bevel having three triangle-shaped adjoining legs, with an articulating joint between the hypotenuse leg and each adjoining leg. The other two non-hypotenuse legs are capable of being latched or detached by a latching joint that, when latched, forms a substantially 90 degree angle between the two non-hypotenuse legs to function as a carpenter's square. One of the articulating joints at the hypotenuse leg is capable of tightening and loosening. The hypotenuse leg also consists of a slot positioned longitudinally of the hypotenuse leg. The tightening and loosening articulated joint joins the hypotenuse leg with an adjacent leg through the slot, which allows the adjacent leg movement about the joint relative to the hypotenuse leg to function as a bevel. The articulated joints and the detaching function of the latching joint allows the combination square and bevel/sliding bevel to be folded into a compact shape.

30 Claims, 11 Drawing Sheets

U.S. PATENT DOCUMENTS

| | | |
|---|---|---|
| 1,653,561 A | 12/1927 | Gray |
| 1,841,972 A * | 1/1932 | Mosley ............... 33/419 |
| 2,080,792 A | 5/1937 | Simmons ............. 33/110 |
| 2,140,098 A * | 12/1938 | Weiskoff ............. 33/419 |
| 2,485,777 A * | 10/1949 | Rogers ............... 33/472 |
| 2,926,706 A * | 3/1960 | Hopla ................ 83/486.1 |
| 2,990,620 A | 7/1961 | Tagliere .............. 33/98 |
| 3,153,859 A * | 10/1964 | Jones ................. 33/419 |
| 3,289,301 A | 12/1966 | Hanson ............... 33/93 |
| 3,345,750 A | 10/1967 | Hill .................. 33/75 |
| 3,513,551 A * | 5/1970 | Geiger ............... 33/420 |
| 3,574,945 A | 4/1971 | Main et al. .......... 33/70 |
| D246,699 S | 12/1977 | Pingel ............... D10/65 |
| D260,616 S | 9/1981 | Groves ............... D10/65 |
| 4,562,649 A | 1/1986 | Ciavarella ........... 33/419 |
| D290,092 S | 6/1987 | Bies ................. D10/65 |
| 4,872,267 A * | 10/1989 | Anderton ............. 33/463 |
| 5,384,967 A | 1/1995 | Helmuth .............. 33/456 |
| 5,438,761 A * | 8/1995 | Krumszyn et al. ...... 33/451 |
| 5,446,969 A | 9/1995 | Terenzoni ............ 33/419 |
| 5,461,794 A | 10/1995 | Huang ................ 33/470 |
| 5,669,149 A | 9/1997 | Meitzler ............. 33/471 |
| 5,971,677 A | 10/1999 | Lan .................. 408/236 |
| 5,974,677 A | 11/1999 | Butwin ............... 33/463 |
| 6,134,795 A | 10/2000 | Hitchcock ............ 33/451 |
| 6,334,261 B1 | 1/2002 | Scillia et al. ....... 33/456 |

* cited by examiner

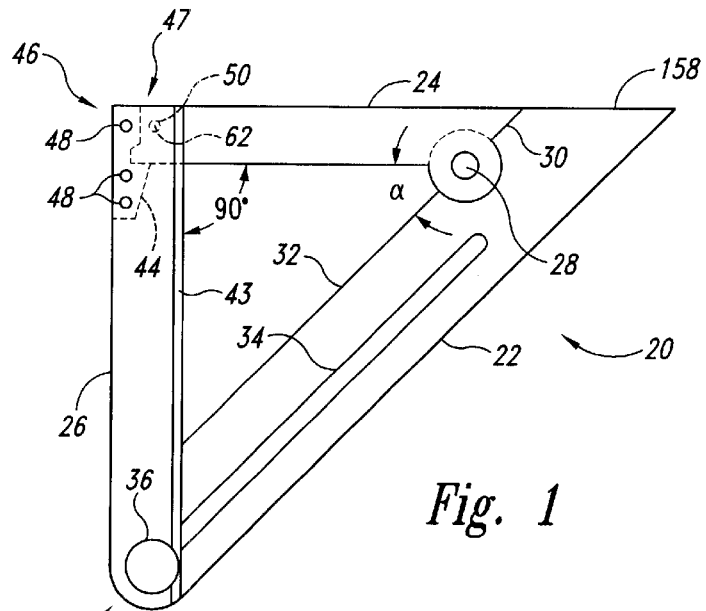
Fig. 1
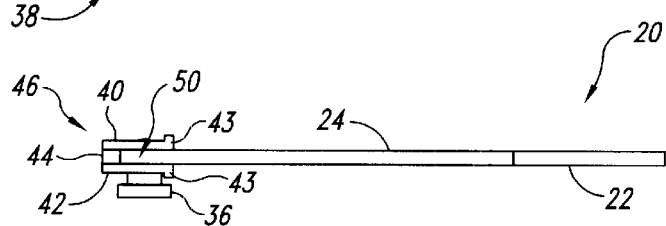
Fig. 2
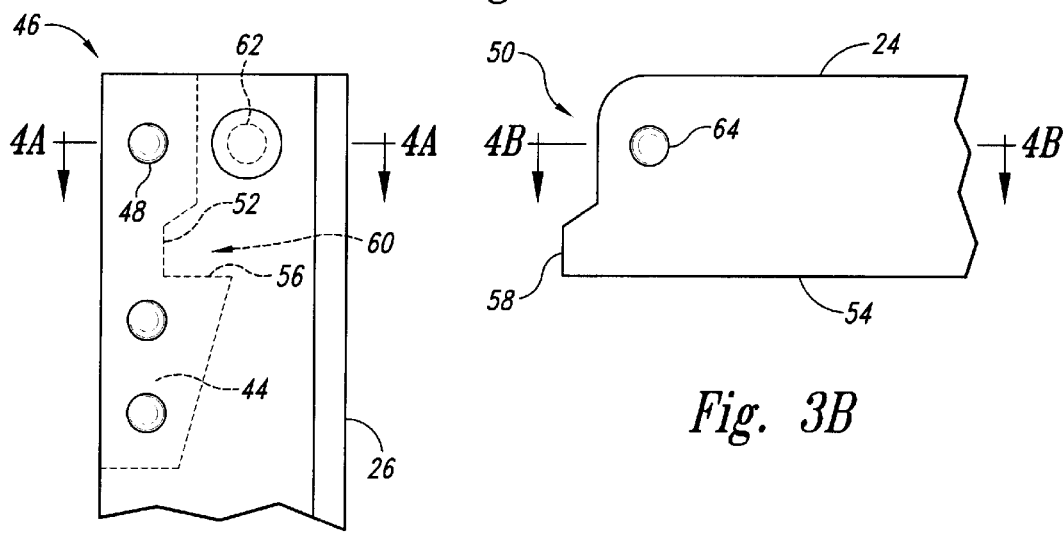
Fig. 3A
Fig. 3B

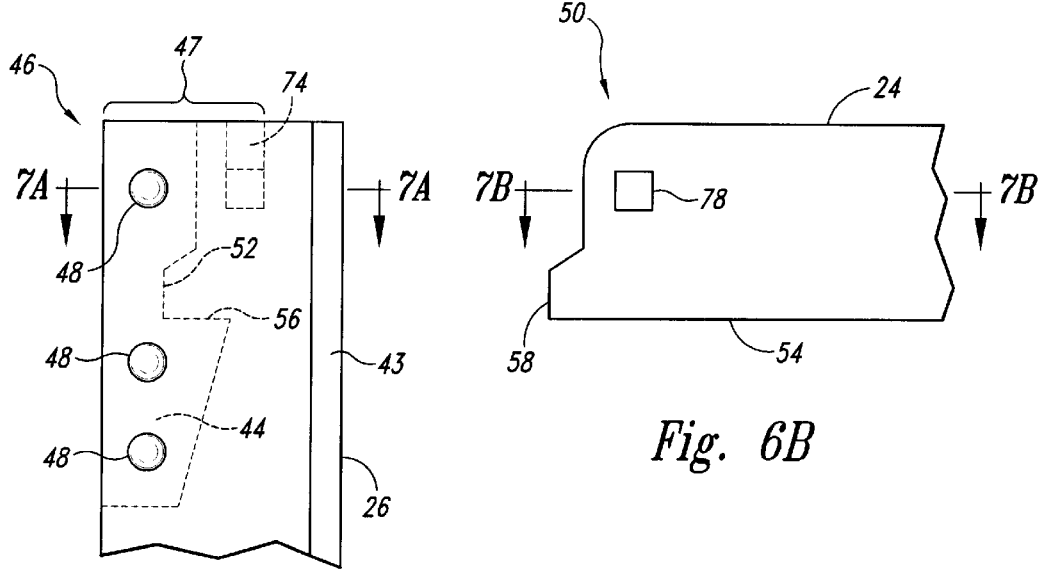
Fig. 6A
Fig. 6B
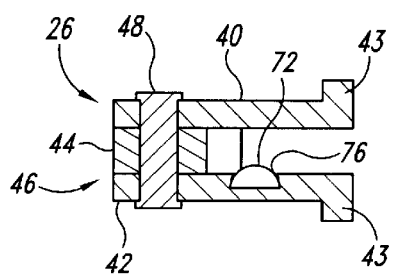
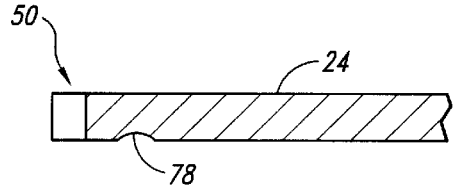
Fig. 7A
Fig. 7B

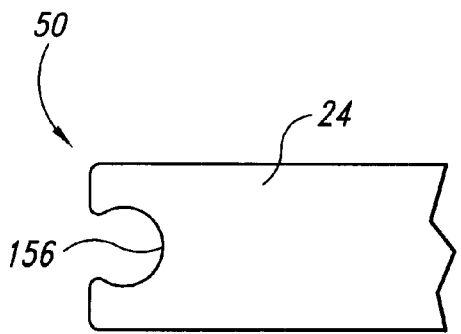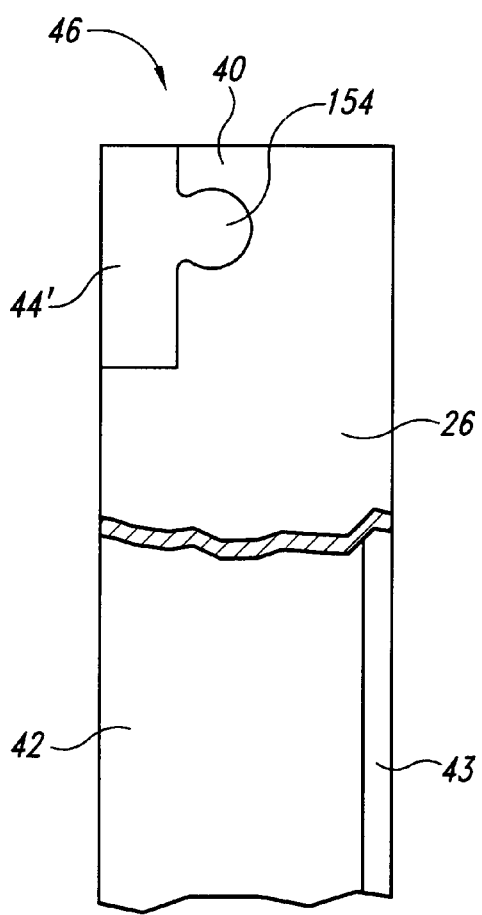
Fig. 14B
Fig. 14A

FOLDING CARPENTER'S SQUARE, BEVEL, AND SLIDING BEVEL

RELATED APPLICATION

This application claims priority to U.S. Provisional Application Ser. No. 60/316,869, filed Sep. 4, 2001, and entitled "Folding Carpenter's Square and Sliding Bevel."

TECHNICAL FIELD

The present invention relates, generally, to carpentry tools. More particularly, the invention relates to a folding carpenter square and a bevel tool.

BACKGROUND OF THE INVENTION

The state of the art includes various carpenter's squares for laying out square and angled lines for various purposes, such as the well-known Swanson Speed Square, and tools for transferring bevel angles. But prior art devices are believed to have significant limitations and shortcomings. U.S. Pat. No. Des. 290,092 to Bies discloses a carpenter framing square that has a triangular-shaped member with an attached pivotable element. The tool is very useful for layouts, rafter cuts, and as a protractor for marking angles; however its bulky triangular shape is not conducive for easy storage and carrying.

Several U.S. patents, such as U.S. Pat. No. 5,446,969 to Terenzoni and U.S. Pat. No. 3,289,301 to Hanson, disclose squares having an L-shaped element pivotally connected to another element. The L-shaped piece provides a fixed 90 degree angle when desired and the pivoting piece allows angular layout. Though the two elements can fold together, the tool is still very bulky due to the L-shaped piece.

Numerous patents disclose tools having three members with pivot connections between at least two of the members that allow articulation of the members relative to each other to make some measurement and/or to layout lines. Because the members are articulated, they can be folded into a straight compact form. U.S. Pat. No. 5,974,677 to Butwin, U.S. Pat. No. 5,384,967 to Helmuth, and U.S. Pat. No. 3,574,945 to Main, are typical of such patents. Ninety degree angles are formed by elements when they are in a certain position relative to each other, and the elements can be moved to determine other angles. In the Main device, one element slides relative to another to maintain a 90 degree angle.

A sliding bevel is a very useful tool for laying out and transferring bevels from existing construction to new work. In such a sliding bevel, one part freely slides and pivots relative to another part. An example is disclosed in U.S. Pat. No. 228,027 to Bissell.

Of the devices with two or three arms with pivoting connections therebetween used to layout square and angled lines, none are as suitable as the Bissell bevel device for transferring bevels since they do not have a sliding and freely pivoting element. The Bissell bevel device, however, is not suited for laying out 90 degree lines like a carpenter square.

Since both a carpenter square and a sliding bevel are very useful tools, both are typically carried in a carpenter's tool box or work belt. It is desirable to have a single tool that can perform the functions of a carpenter square, such as the Beis device, and the functions of a sliding bevel, such as the Bissell device, and be foldable into a small compact unit, such as the Butwin device.

SUMMARY OF THE INVENTION

The present invention comprises a foldable triangle-shaped carpentry tool having three adjoining legs, with an articulating joint between the hypotenuse leg and each adjoining leg. The other two non-hypotenuse legs are capable of being latched or detached by a latching joint that, when latched, forms a substantially 90 degree angle between the two non-hypotenuse legs to function as a carpenter's square. A slot in the hypotenuse leg with one of the articulating joints being capable of tightening and loosening the joint relative to its adjacent leg to the slot allows the adjacent leg movement about the joint relative to the hypotenuse leg to function as a bevel or sliding bevel.

The articulated joints and the detaching function of the latching joint allows the combination square and bevel/sliding bevel to be folded into a compact shape. The carpentry tool may be folded even more compactly when one of the non-hypotenuse legs is comprised of two opposing members that are in a parallel, spaced-apart relationship to the other where the spaced relationship is sufficient to receive at least an edgewise portion of the other non-hypotenuse leg when the articulating joint capable of loosening is loosened, the other articulated joint is articulated, and the latching joint between the non-hypotenuse legs is detached.

The latching joint means can be one of many embodiments described in more detail in the "Best Mode for Carrying Out the Invention."

The present invention further comprises a method for compactly folding the combined carpenter's square and bevel/sliding bevel.

BRIEF DESCRIPTION OF THE DRAWINGS

Like reference numerals are used to designate like parts through the several views of the drawings, wherein:

FIG. 1 is a side view of the folding square of the present invention illustrated in an opened position;

FIG. 2 is a top view of the square illustrated in FIG. 1;

FIG. 3A is an enlarged view of a first embodiment of the latching mechanism between the second and third legs of the square that forms a 90 degree angle when the mechanism is latched;

FIG. 3B is an enlarged view of a portion of the second leg shown exploded away from the latching mechanism of FIG. 3A;

FIGS. 6A and 6B are views like FIGS. 3A and 3B illustrating a third embodiment of a latching mechanism;

FIGS. 7A and 7B are sectional views taken substantially along line 7—7 of FIGS. 6A and 6B;

FIGS. 14A and 14B are side views of a ninth alternate embodiment of the latching mechanism shown in cutaway;

BEST MODE FOR CARRYING OUT THE INVENTION

Figure 4A:
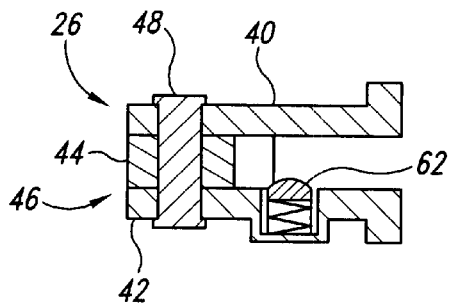
FIGS. 4A and 4B are sectional view taken substantially along line 4—4 of FIGS. 3A and 3B.
Figure 4B:
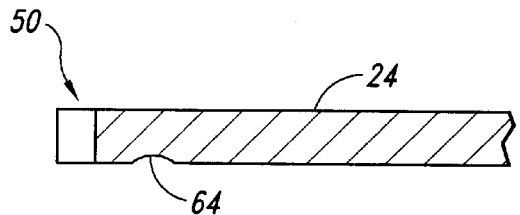

Referring to FIGS. 1 and 2, an example of the preferred embodiment of the present invention is illustrated and generally indicated by the reference numeral 20. Folding square 20 preferably has an overall triangular shape with adjoining three legs 22, 24 and 26, with leg 22 being the hypotenuse leg.

First and second legs 22 and 24 are preferably flat planar members and have an articulating joint 28 between them such that leg 24 will open planarly with leg 22. In preferred form, articulated joint 28 is a pivotable joint. An angle α is formed between the first and second legs 22, 24 at joint 28 when the folding square 20 is in the open position as illustrated in FIG. 1. In preferred form, angle α is approximately 45 degrees, although, theoretically, a can be any acute angle under 90 degrees. Further opening of joint 28 past the 45 degrees between the first and second legs may be stopped by contact of a beveled end 30 of the second leg 24 against an inner edge 32 of the first leg 22. When the square is to be folded, leg 24 can fold inward against inner edge 32 via the pivotable joint 28, thus, reducing angle α from the preferred range of approximately 45 degrees to approximately zero degrees.

First leg 22 has an elongated slot 34 therein where one end of slot 34 may begin at or near articulating joint 28 and the other end of slot 34 may end at or near another articulating joint 36 between first leg 22 and third leg 26. Articulating joint 36, which joins first leg to the third leg, is capable of tightening and loosening the connection of the first leg 22 to the third leg 26. In a preferred embodiment, third leg 26 is connected to first leg 22 by a thumb screw, although other articulating joints may be used, such as a wing nut. Although it is easier to use a hand-operated screw, nut or other hand-operated tightening means, the invention still encompasses an articulated joint 36 that can be tightened or loosened by a wrench or other mechanical device. Articulating joint 36 has a lower portion (e.g. a substantially cylindrically-shaped, threaded base) that engages and slides within slot 34 so that end 38 of third leg 26 can be positioned anywhere along slot 34 and secured by the articulating joint 36. Positioning the third leg 26 along the slot relative to the first leg allows the tool to function as a bevel and sliding bevel, of which functions are further discussed below.

Figure 18:
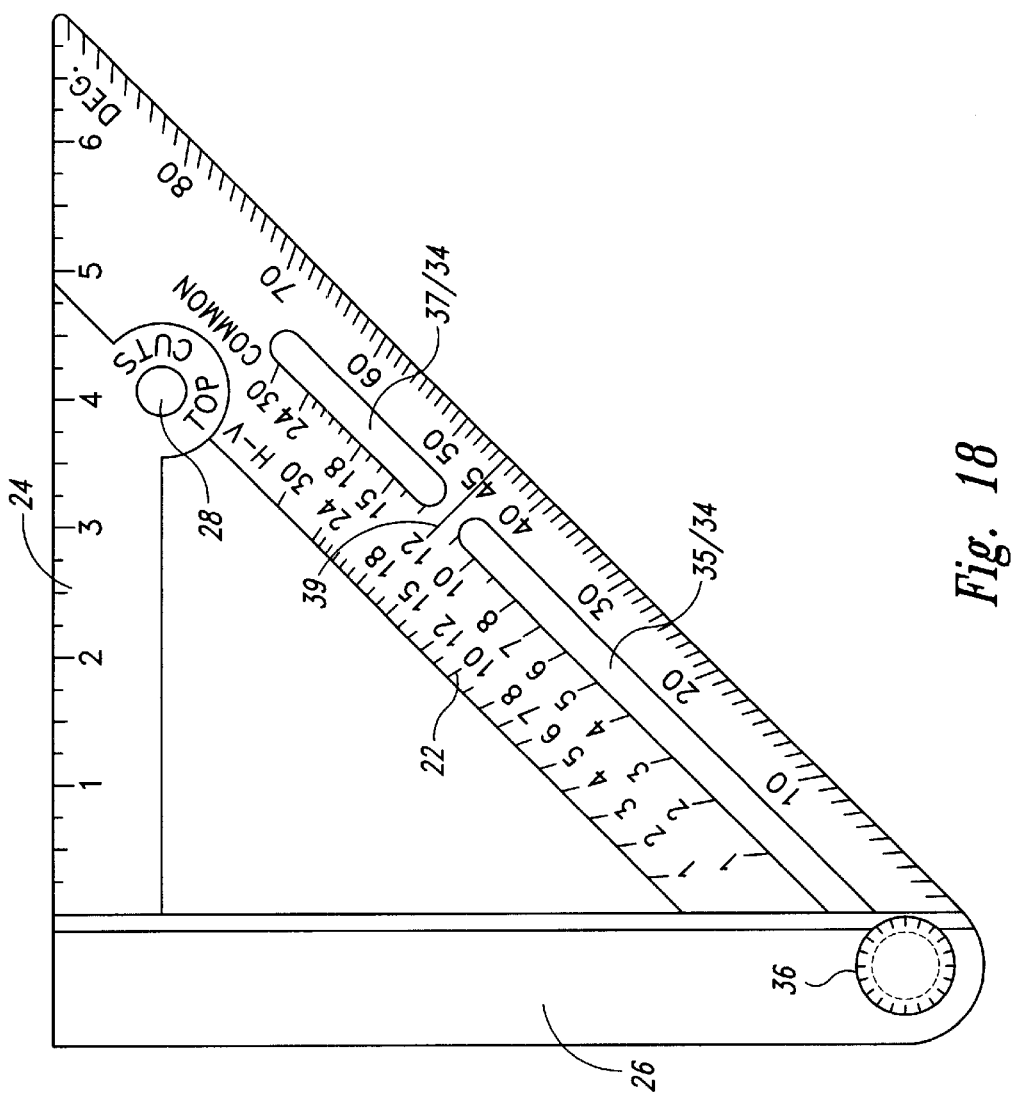
FIG. 18 is a side view like that of FIGS. 1 and 17 illustrating an alternate embodiment including a reinforcing bridge thereby dividing the slot in the first leg.

Another embodiment of the slot is illustrated in FIG. 18 where a reinforcing bridge 39 or reinforcing bridges (one bridge is illustrated) may divide slot 34 into two or more slots (two are illustrated at designations 35, 37). Depending on the materials selected to form the tool 20, a reinforcing bridge, which may be integrally molded into the first leg during manufacturing, may provide reinforcing strength to the hypotenuse leg. As a practical matter, once the slot is half the length of the hypotenuse leg, there is no need to have the third leg be attached to slot 37 as the sliding bevel function is complete by sliding anywhere along the "half slot," as illustrated at numeral 35. However, if it is desired to move third leg 26 relative to first leg 22 along slot 37, the articulating joint 36 will need to be capable of removal in order to join the third leg to the first leg anywhere along both slots 35, 37 once the articulating joint 36 is repositioned within the new slot and tightened. A thumb screw, as the preferred embodiment, or a wing nut, inherently has the capabilities of removal and reattachment. In either embodiment, third leg 26 can be positioned at nearly any angle relative to first leg 22 about the articulating joint 36 when the joint is tightened and the third and second legs 26, 24 are not attached or otherwise joined.

Third leg 26 substantially comprises two opposing elongated members 40 and 42 in a spaced-apart, parallel arrangement with a spacer 44 disposed between members 40, 42 near the upper end 46 of third leg 26. Opposing members 40 and 42 and spacer 44 may be integrally formed of the spacer 44 or the spacer may be fastened to opposing members 40, 42 by mechanical fasteners 48, such as rivets (which are illustrated). However, if the spacer and opposing members are not integrally formed, any mechanical fasteners or well-known fastening means may be used, such as by welding, brazing, soldering, bonding, or adhering by adhesives or epoxy.

Preferably, first leg 22 and spacer 44 have approximately the same thickness, and a portion of first leg 22 is disposed between opposing members 40 and 42 at end 38, which maintains the spaced-apart, parallel arrangement between members 40 and 42. Articulating joint 36 selectively joins or loosens opposing members 40 and 42 against first leg 22 allowing third leg 26 to be positioned anywhere along slot 34 and at substantially any angle relative to leg 22 such that the folding square 20 can function as a sliding bevel.

When the square 20 is in the open position, such as illustrated in FIG. 1, second and third legs 24 and 26 form a substantially 90 degree angle at an attachable and latchable joint 47. An end portion 50 of second leg 24, and opposite of the end of second leg 24 containing the pivotable joint 28, is capable of being latched and detached by the latching joint 47 from upper end 46 of third leg 26. The latching joint in the form of various embodiments and mechanisms joining the area around upper portion 46 of third leg 26 and the end portion 50 of second leg 24 maintains the substantially 90 degree angle between leg 24 and 26 and secures them together so that the folding square 20 is sufficiently sturdy for use as a conventional carpenter square. Latching of legs 24 and 26 can be accomplished by one of the numerous examples of typical latching means illustrated in FIGS. 3A–14B, or by any other well-known latching means.

Referring to FIGS. 3A–3B, and 4A–4B, end portion 50 of second leg 24, which is preferably received between opposing members 40 and 42, abuts an edge 52 of spacer 44. Opposing members 40, 42 may each include an outwardly extending lip 43 that acts as a guide and register when positioned against a board. In lieu of lips 43, opposing members 40, 42 may have sufficient thickness (approximately ¼ inch or more) to provide a stop (or register) against a board (not shown) or member (also not shown) when using the carpentry tool 20 as a carpenter's square. An inner edge 54 may index an edge 56 of spacer 44 to accurately position leg 24 relative to leg 26.

Preferably, the spacing of opposing members 40 and 42 provides sufficient clearance for the end portion 50 of second leg 24 and the latching joint that is used to keep second leg 24 in a 90 degree latching relationship relative to third leg 26 when the square 20 is in the open position. While the space between opposing members 40 and 42 of third leg 26 may be such that second leg 24 can be sufficiently held between members 40 and 42 by friction, the fit between components loosen and, over time, may not provide enough friction to hold second leg 24 and third 26 together. To overcome this potential issue, end portion 50 may have a tenon portion 58 that is received in a mortise cavity 60 in spacer 44. A precision fit between tenon portion 58 and mortise cavity 60 is preferably maintained so that pushing tenon portion 58 into mortise cavity 60 results in a substantially 90 degree angle between leg 24 and leg 26 when tenon portion 58 is properly seated within mortise cavity 60.

The latching joint 47 of the embodiments illustrated in FIGS. 3A–3B and 4A–4B may further include a spring-loaded pin 62 installed in one of the opposing members (42 is shown) to engage with a corresponding spherical divot 64 in the end portion 50 of second leg 24. The corresponding spherical divot 64 is positioned on the side of the end portion that corresponds to the opposing member of which the spring-loaded pin 62 is a part. The divot 64 keeps tenon portion 58 firmly engaged in mortise cavity 60 until end portion 50 of second leg 24 is pulled away from third leg 26. This mechanism is similar to that which keeps sockets on a socket wrench. The latching can be accomplished without the tenon and mortise detail, but the tenon and mortise arrangement, or other such positive indexing feature, is preferred for a more positive engagement of the end portion 50 against spacer 44.

Figure 5A:
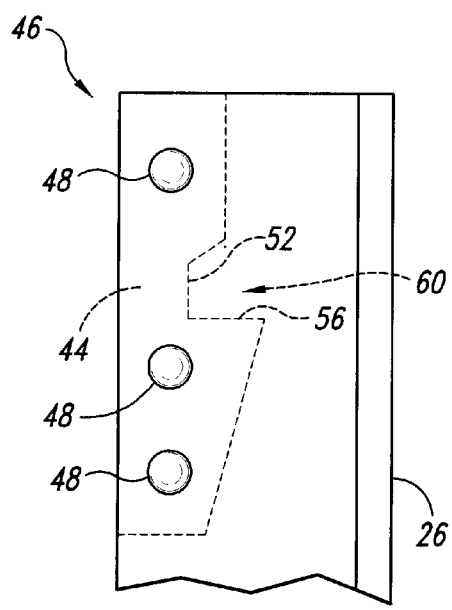
FIGS. 5A and 5B are views like FIGS. 3A and 3B illustrating a second embodiment of the latching mechanism.
Figure 5B:
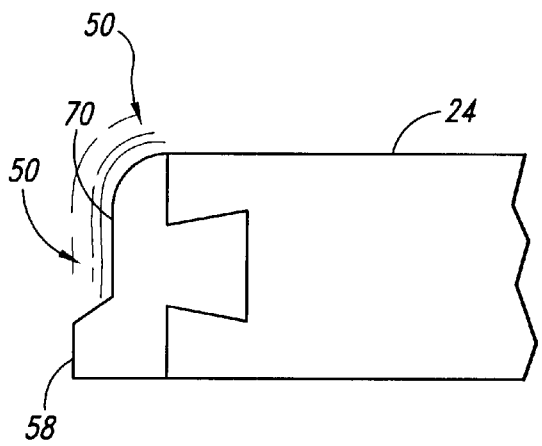
Figure 8A:
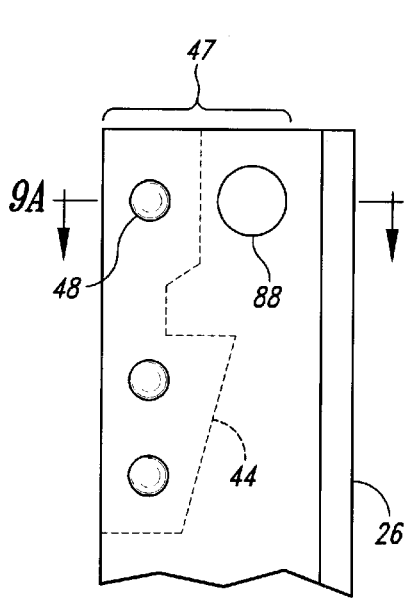
FIGS. 8A and 8B are view like FIGS. 3A and 3B illustrating a fourth embodiment of the latching mechanism.
Figure 8B:
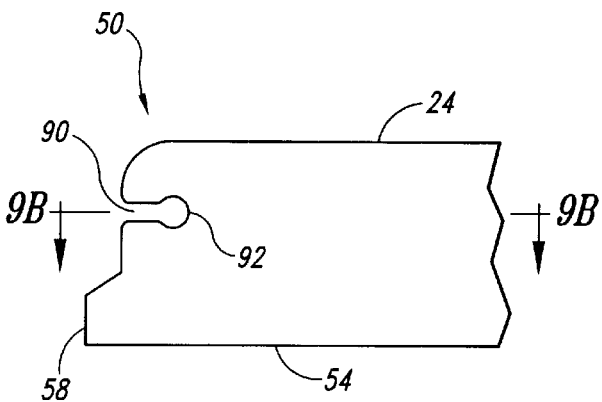
Figure 9A:
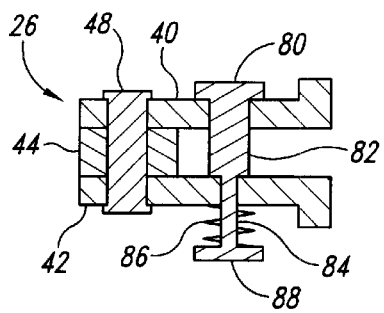
FIGS. 9A and 9B are sectional views taken substantially along line 9—9 of FIGS. 8A and 8B.
Figure 9B:
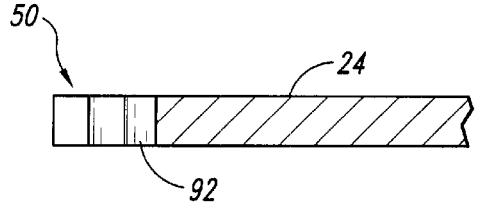

Referring to FIGS. 5A–5B, another latching joint/mechanism is illustrated where end portion 50 of second leg 24 has a magnetic insert 70 attached at end 50 and spacer 44 is made of steel or at least contains some magnetically attracting (e.g. ferrous) materials. Preferably insert 70 and spacer 44 have a corresponding tenon portion 58 and mortise cavity 60 respectively, as described above, to encourage a more positive engagement when in the latched mode. The magnetic attraction between magnetic insert 70 and spacer 44 keeps end portion 50 of second leg 24 engaged with spacer 44 of third leg 26 until a force is exerted upon the latched joint to pull the magnetic insert (and, thereby, the end portion 50 and second leg 24) from the magnetically-attracting spacer 44. The result is that second leg 24 is detached or pulled apart from third leg 26. This arrangement is mechanically simpler than the latching arrangement of FIGS. 3A–3B and 4A–4B, which eliminates the need for the spring-loaded pin and its associated structure.

Referring to FIGS. 6A–6B and 7A–7B, this embodiment of the latching joint/mechanism is similar to that of FIGS. 3A–3B and 4A–4B using a spring-detent to bias against an abutment. Here, a strip-spring detent 72 is installed in a dado slot 74 and is retained by the undercut edges 76 of the dado slot. Divot 78 in end portion 50 of second leg 24 has a cylindrically shaped surface to receive strip-spring 72. This joint/mechanism is simple to produce, but has the disadvantage that if the strip-spring 72 comes out of dado slot 74, the latching ability may be lost along with the strip-spring. Alternatively, the detent may be integrally formed within one of the two opposing members (less the strip-spring). This embodiment works particularly well when the legs are molded from a man-made plastic or polymer.

Referring to FIGS. 8A–8B and 9A–9B, which illustrate yet another embodiment of the latching joint, a spring-loaded pin 80 may be installed across both members 40 and 42 of leg 26. Pin 80 has a larger diameter portion 82 and a smaller diameter portion 84 and is biased by spring 86 that acts between member 42 and a button portion 88 at the end of smaller diameter portion 84 to keep larger diameter portion 82 in position across the space between members 40 and 42. When button portion 88 is manually pushed toward member 42, pin 80 slides so that smaller diameter portion 84 extends across the space between members 40 and 42. The smaller diameter portion 84 will pass through a slot 90 in the end 50 of arm 24 and into aperture 92. Releasing button portion 88 then allows larger diameter portion 82 of pin 80 to move into aperture 92, thereby latching arm 24 to arm 26. Since the larger diameter portion 82 cannot pass through slot 90, arm 24 and arm 26 are securely held together until the button portion 88 is pushed. This mechanism offers a very secure latching means between legs 24 and 26, but is rather complicated.

All of the latching mechanisms described above latch against the wide side of leg 24 or through it. Other latching mechanisms can act across the end 46 of leg 26 and engage the outer edge of leg 24. Some examples of these latching mechanisms are shown in FIGS. 10A–13B.

Figure 10A:
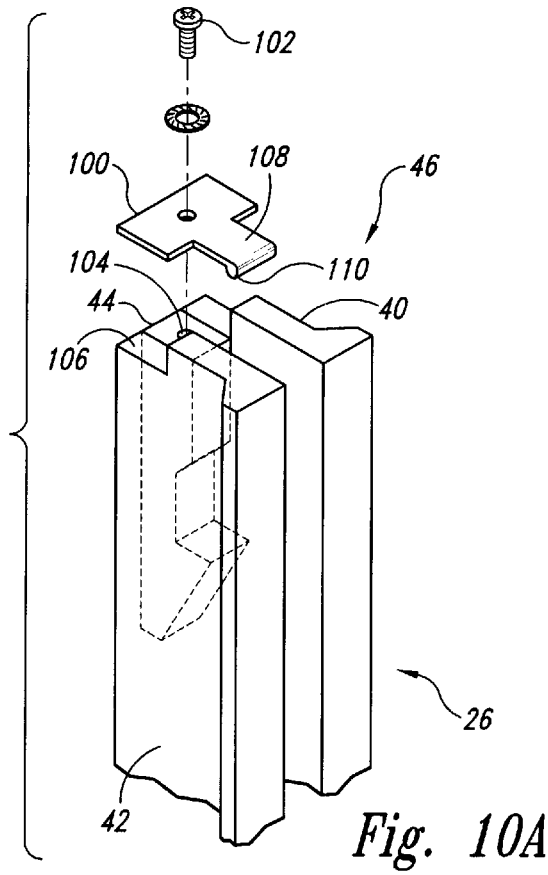
FIG. 10A is a partially exploded perspective view of a fifth embodiment of the latching mechanism.
Figure 10B:
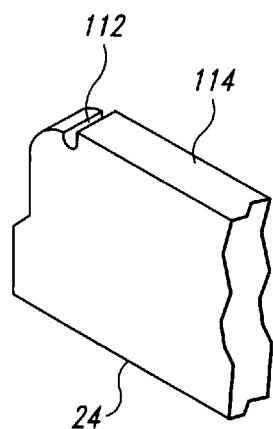
FIG. 10B is an enlarged perspective view of a portion of the second leg shown exploded away from the latching mechanism of FIG. 10A.

Referring to the embodiment illustrated in FIGS. 10A and 10B, a spring latch 100 may be attached to the end 46 of leg 26, such as by a threaded fastener 102 screwed into an aperture 104 in spacer 44. Opposing members 40 and 42 have a recessed area 106 to receive spring latch 100 so that the outside of spring latch 100 is flush with end 46. Spring latch 100 has a catch 108 extending into the space between members 40 and 42. Catch 108 preferably has a lip 110 extending downward from catch 108 that engages a notch 112 in outer edge 114 of leg 24. Lip 110 preferably is rolled or otherwise rounded to facilitate smooth engagement and disengagement with notch 112. This latching mechanism is desirable because it requires the least amount of work acted upon opposing members 40 and 42.

Figure 11A:
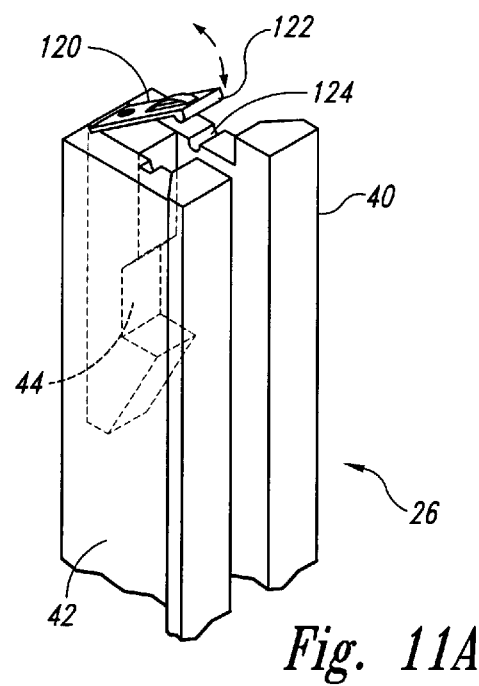
FIG. 11A is a perspective view of a sixth embodiment of the latching mechanism.
Figure 11B:
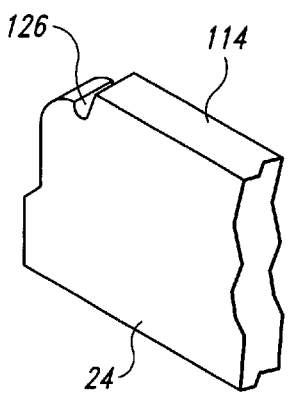
FIG. 11B is an enlarged perspective view of a portion of the second leg shown exploded away from the latching mechanism of FIG. 11A.

Referring to FIGS. 11A and 11B illustrating yet another embodiment of the latching joint, a pivoting latch 120 may be attached to the end of spacer 44 in a similar manner to that of spring catch 100 illustrated in FIGS. 10A and 10B. Latch 120 has a lip 122, which slides through a notch 124 in member 40 and engages notch 126 in outer edge 114 of leg 24. When activated, latch 120 is then pivoted, as indicated by the arrows, to engage or disengage notch 126. Latch 120 may be activated by hand. Once latch 120 engages notch 126, its position relative to end portion 50 is retained by friction.

Figure 12A:
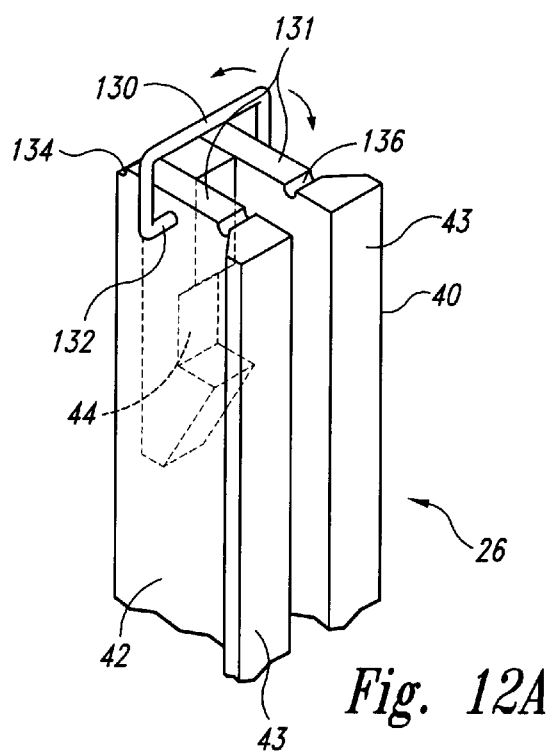
FIGS. 12A and 12B are views like FIGS. 11A and 11B illustrating a seventh embodiment of the latching mechanism.
Figure 12B:
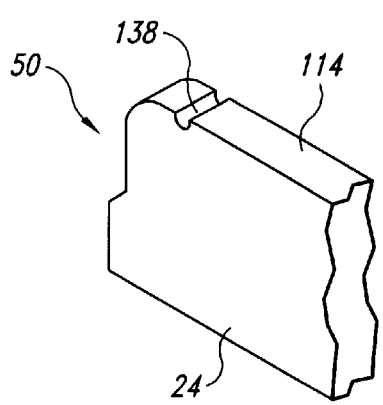

Referring to FIGS. 12A and 12B, which is yet another embodiment of the latching joint between third leg 26 and second leg 24, a wire latch 130 may be installed across upper edge 131 of leg 26 so that it spans both members 40 and 42 and pivots on wire latch's ends 132, which, in turn, engage opposing members 40 and 42. This latching embodiment is similar to a typical bucket handle. Wire latch 130 may be pivoted outward to engage a notch 134 across upper edge 131 adjacent spacer 44 so that wire latch 130 is held out of the way of second leg 24 when second leg 24 is to be disengaged from leg 26. With leg 24 properly engaged in leg 26, notches 136 in members 40 and 42 align with a notch 138 in outer edge 114 of leg 24 and latch 130 can be pivoted to engage notches 136 and 138, thereby retaining leg 24 in position against leg 26.

Figure 13A:
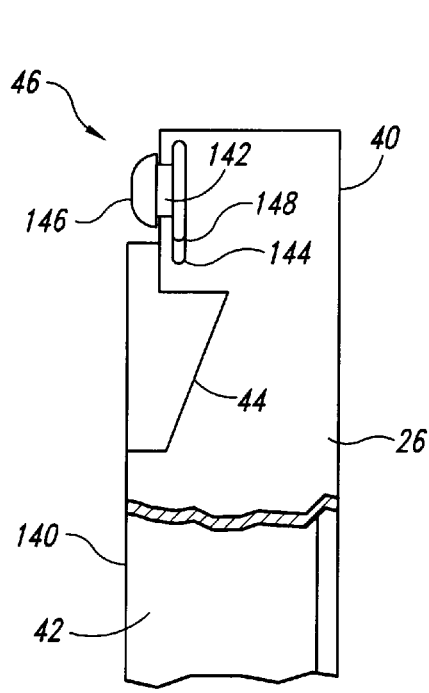
FIG. 13A is a side view of an eighth embodiment of the latching mechanism with a portion of member 42 shown in cutaway to better reveal the latching mechanism.
Figure 13B:
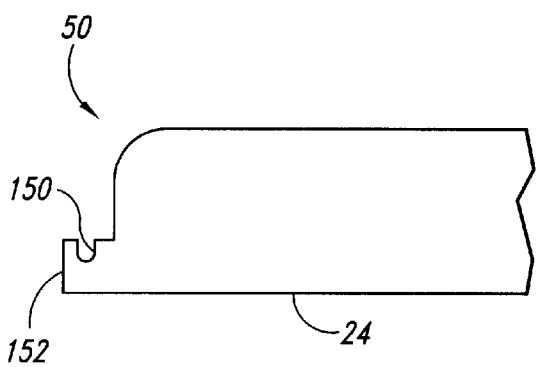
FIG. 13B is an enlarged side view of a portion of the second leg shown exploded away from the latching mechanism of FIG. 13A.
Figure 13C:
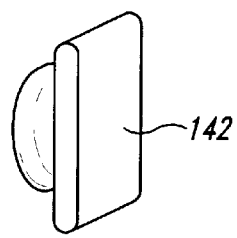
FIG. 13C is an enlarged perspective view of a portion of the latching mechanism.

Referring to FIGS. 13 A–C, which illustrate another embodiment of the latching joint, the latching joint may be installed on outer edge 140 of third leg 26. In this embodiment, the upper portion of outer edge 140 is recessed to better accommodate a sliding latch 142 that engages and is retained by a slot 144 that is formed of opposing members 40, 42. The recessed joint in the upper portion of outer edge 140 allows edge 140 to be placed against other structures when folding square 20 is used as a sliding bevel. Sliding latch 142 may have a handle portion 146 suitable for engaging an operator's thumb to facilitate movement of latch slot 144. Sliding latch 142 may also include a lower end 148 that engages a notch 150 in tenon portion 152 on end portion 50 of second leg 24 when end portion 50 is properly positioned relative to upper portion 46 of third leg 26 and sliding latch 142 is pushed downward to be received within notch 150. Upward motion of sliding latch 142 moves lower end 148 out of notch 150 allowing end portion 50, and, thereby, second leg 24 to break away or otherwise be separated from third leg 26. This latch mechanism is similar to the switch on a conventional flashlight.

In a last embodiment of the latching joint, as illustrated by FIGS. 14A and 14B, a classic tenon portion 154 can be formed of or within (e.g. integrally molded or machined) or attached to spacer 44. A corresponding notch 156 is formed within end portion 50 of second leg 24. Although this joint mechanism is relatively simple to manufacture, over time, wear can cause the joint to have some undesirable play when the tenon is received into notch 156. This can cause misalignment of the two ends of the second and third legs such that the resulting angle is not a true 90 degrees. However, this embodiment may be the most cost-effective.

Figure 15A:
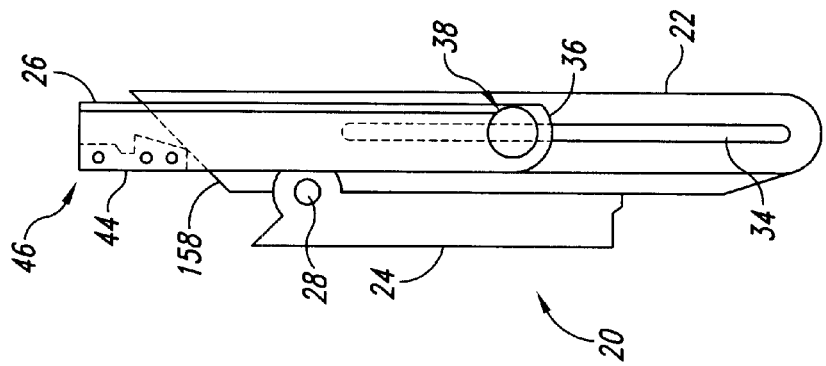
FIGS. 15A–15C are side views illustrating the sequential steps of folding a square of the present invention.
Figure 15B:
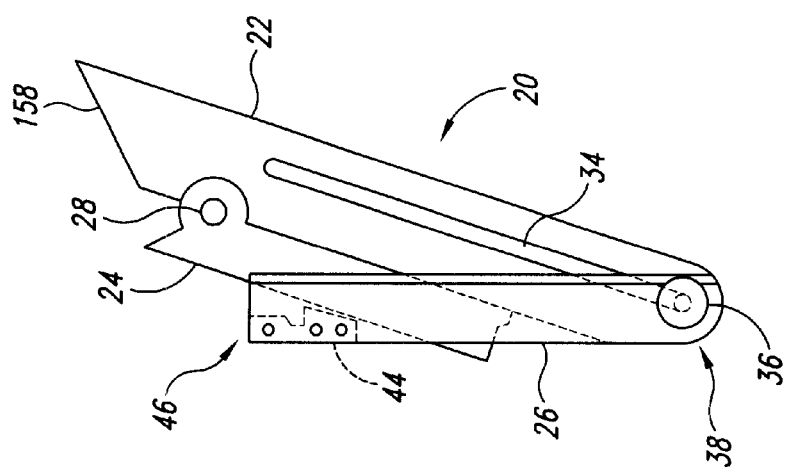
Figure 15C:
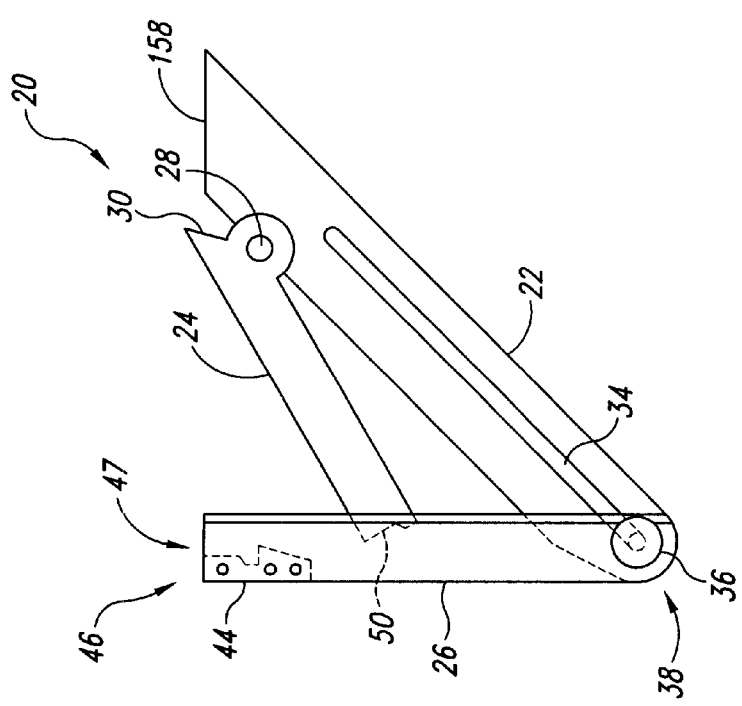

Referring to FIGS. 15A–15C, folding square 20 is capable of folding into a compact form as illustrated in FIG. 15C. The latching joint 47 that holds second leg 24 and third leg together is released and second leg 24 is pivoted inward as indicated by the arrow in FIG. 15A. First leg 22 can be moved outward from third leg 26 to allow end 50 portion to clear spacer 44. First leg 22 is then pivoted toward third leg 26 as indicated by the arrow in FIG. 15B. Second and first legs 24 and 22 slide between opposing members 40 and 42 of third leg 26 until second leg 24 bumps against spacer 44. Thumb screw 36 is then loosened sufficiently that third leg 26 can slide along slot 34 as indicated by the arrow in FIG. 14C until spacer 44 clears end 158 of first leg 22. This allows third leg 26 to pivot so that it is substantially aligned with first and second legs 22 and 24 as shown in FIG. 15C. Thumb screw is then tightened to keep folding square 20 in its compact form for storage.

Figure 16A:
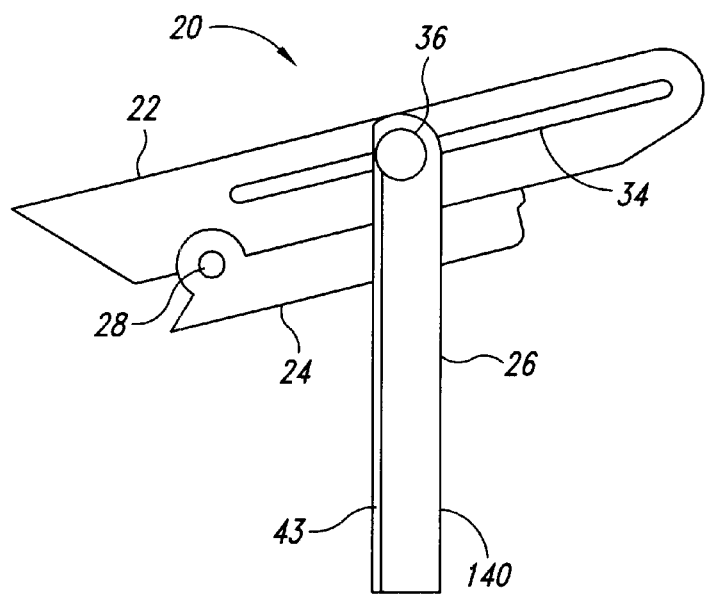
FIGS. 16A and 16B are side views illustrating the use of the folding square as a bevel and sliding bevel.
Figure 16B:
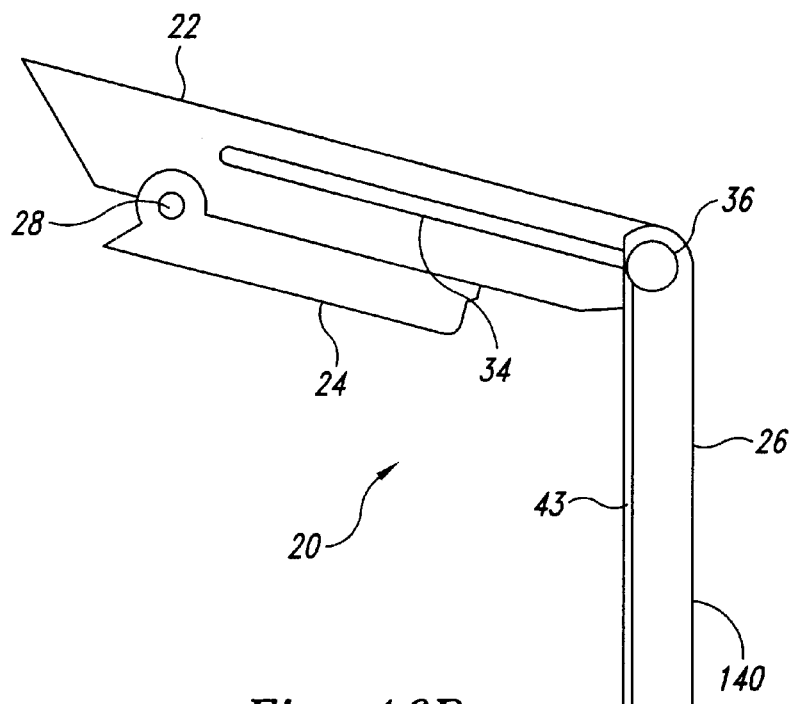

Referring to FIGS. 16A and 16B, folding square 20 can be used as a bevel and a sliding bevel simply by loosening the articulating joint 36 (e.g. the thumb screw) and sliding first leg 22 along slot 34 and pivoting it to the desired position relative to third leg 26, and again tightening thumb screw 36 to maintain the relative position of first leg 22 to third leg 26 about thumb screw 36.

Figure 17:
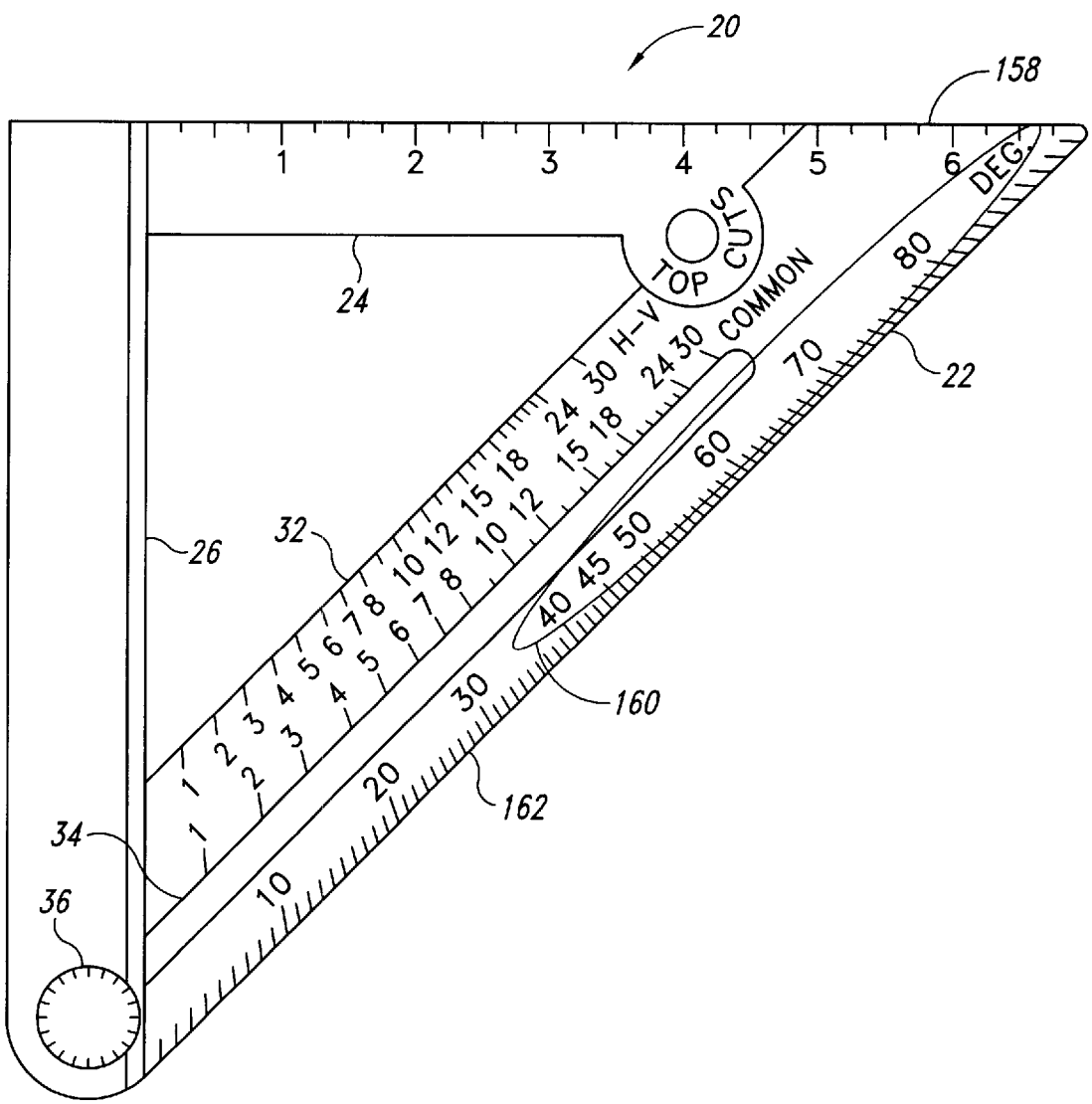
FIG. 17 is a side view like that of FIG. 1 illustrating indicia provided on the square for marking various measurements that can be determined using the square.
Figure 19:
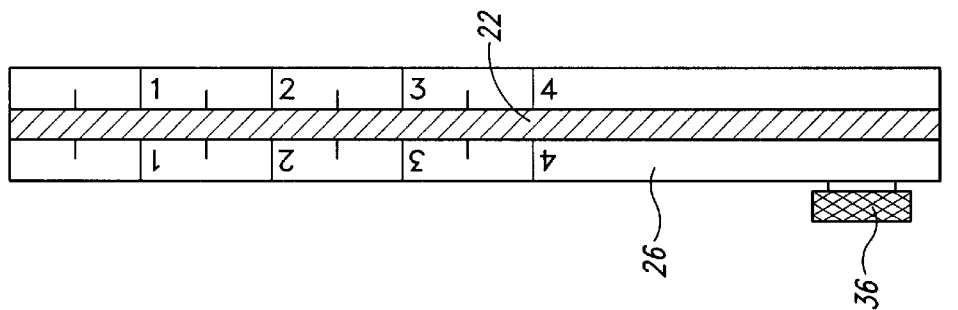
FIG. 19 is a right end elevational view of FIG. 18.

Referring to FIGS. 17 and 18, second and first legs 24 and 22 preferably include indicia 160 laid out along the longitudinal length of either side of the two legs to indicate various measurements typical of carpenter squares. Length markings such as inches or centimeters can be provided along leg 24 and across end 162 of first leg 22. Angle measurements are preferably marked along outer edge 162 of first leg 22. Typical demarcations for hip/valley measurements and common rafter measurements are preferably also provided along first leg 22 with the hip/valley measurements preferably located along inner edge 32, and common rafter markings preferably being located along slot 34.

The folding square 20 can be made out of any suitable material such as cast aluminum, stamped steel, or man-made materials (e.g. plastic). Injection molded plastic provides a low cost manufacturing where certain elements can be eliminated, such as rivets 48 or spring-detent 72, if the square and spacer and detent are integrally formed. It provides a single tool that performs the function of a conventional carpenter square for layout work, rafter cuts, and angle marking, as well as that of a sliding bevel to register both inside and outside angles on existing construction. The tool folds into a compact form for easy storage and carrying in a toolbox or tool belt.

The illustrated embodiments are only examples of the present invention and, therefore, are non-limitive. It is to be understood that many changes in the particular structure, materials, and features of the invention may be made without departing from the spirit and scope of the invention. Therefore, it is the Applicant's intention that his patent rights not be limited by the particular embodiments illustrated and described herein, but rather by the following claims interpreted according to accepted doctrines of claim interpretation, including the Doctrine of Equivalents and Reversal of Parts.

What is claimed is:

1. A carpentry tool comprising:
   a generally rigid triangular member having three legs in which a first leg acting as the hypotenuse of the rigid triangular member has two oppositely-situated end portions being joined by an articulating joint to corresponding end portions of the other two adjacent second and third legs;
   end portions of the second and the third legs having end surfaces, said end surfaces of the end portions of the second and third legs adjoining each other in a substantially end-to-end relationship by a latching joint capable of latching and detaching the end surface of the second leg relative to the other end surface of the third leg such that when the latching joint is latched, the angle between the end portions of the adjoined second and third legs is substantially 90 degrees and when the latching joint is detached the end portions of the second and third legs break away from each other;
   said first leg defining a slot oriented substantially longitudinally of the first leg; and
   said articulated joint between the first and third legs being capable of tightening or loosening as well as being capable of alignment within the slot of the first leg when the joint is loosened thereby allowing the third leg to be positioned substantially anywhere along the slot and at substantially any angle relative to the first leg and to maintain that position and angle when the articulated joint between the first and third legs is tightened and the latching joint between the second and third legs is detached.

2. The carpentry tool according to claim 1 wherein each leg is substantially flat planar members.

3. The carpentry tool according to claim 2 wherein the first and second legs are coplanar to each other.

4. The carpentry tool according to claim 2 wherein each leg articulates in a plane that is closely parallel to the articulating path of the other legs.

5. The carpentry tool according to claim 1 wherein the articulating joint between the first and third legs is a thumb screw.

6. The carpentry tool according to claim 1 wherein the articulating joint between the first and third legs is a wing nut.

7. The carpentry tool according to claim 1 wherein at least one leg includes indicia.

8. The carpentry tool according to claim 1 wherein one or more reinforcing bridge is included within the slot to form more than one slot along the hypotenuse leg.

9. A carpentry tool comprising:
   a generally rigid triangular member having three legs in which a first leg acting as the hypotenuse of the rigid triangular member has two oppositely-situated end portions being joined by an articulating joint to corresponding end portions of the other two adjacent second and third legs;
   end portions of the second and the third legs being joined by a latching joint capable of latching and detaching such that when the latching joint is latched, the angle between the second and third legs is substantially 90 degrees and when the latching joint is detached the end portions of the second and third legs break away from each other;
   said first leg defining a slot oriented substantially longitudinally of the first leg; and
   said articulated joint between the first and third legs being capable of tightening or loosening as well as being capable of alignment within tie slot of the first leg when the joint is loosened thereby allowing the third leg to be positioned substantially anywhere along the slot and at substantially any angle relative to the first leg and to maintain that position and angle when the articulated joint between the first and third legs is tightened and the latching joint between the second and third legs is detached;
   wherein the third leg consists of two opposing members in a spaced parallel arrangement with a spacer disposed between the two opposing members in the end portion of the third leg that latches with the end portion of the second leg when the latching joint is latched.

10. The carpentry tool according to claim 9 wherein each opposing member includes an outwardly extending lip.

11. The carpentry tool according to claim 9 wherein the articulating joint between the first and third leg is a thumb screw, which is capable of tightening or loosening the two opposing members against the first leg thereby allowing the third leg to be positioned anywhere along the slot and at any angle relative to the first leg.

12. The carpentry tool according to claim 9 wherein the latching joint consists of a tenon in either the end portion of the second leg or the spacer of the third leg and that the tenon is capable of seating within a corresponding mortise cavity in the spacer or second leg end portion where the corresponding tenon is not.

13. The carpentry tool according to claim 12 further comprising a spring-loaded pin in one of the opposing members biased against a corresponding spherical divot in the end portion second leg.

14. The carpentry tool according to claim 12 wherein the latching joint consists of a magnetic insert in either the end portion of the second leg or the spacer of the third leg and that either the end portion of the second leg or the spacer of the third leg where the magnetic insert is not has a corresponding surface to the magnetic insert having magnetically attracting properties to latch the magnetic insert to the corresponding surface.

15. The carpentry tool according to claim 9 wherein the latching joint consists of a magnetic insert in either the end portion of the second leg or the spacer of the third leg and that either the end portion of the second leg or the spacer of the third leg where the magnetic insert is not has a corresponding surface to the magnetic insert having magnetically attracting properties to latch the magnetic insert to the corresponding surface.

16. The carpentry tool according to claim 9 wherein the latching joint consists of a strip-spring installed in a dado slot within one of the opposing members of the third leg that is capable of being biased against a corresponding divot of the end portion of the second leg.

17. The carpentry tool according to claim 9 wherein the latching joint consists of a spring-loaded pin having an external button having a larger diameter cylinder portion and an accessible smaller diameter cylinder portion accessible when the button is manually depressed, the pin is installed across both opposing members of the second leg to engage an aperture across an end of the third leg when the smaller diameter cylinder portion is accessibly.

18. The carpentry tool according to claim 9 wherein the latching joint consists of a recessed lower latch positioned within the two opposing members of the second leg that corresponds to a corresponding lower notched end of the third leg, and a spring latch that is positioned across the top of the end of the second leg to engage an upper notch above the lower notched end in order to latch the second and third legs together.

19. The carpentry tool according to claim 9 wherein the first and second legs are coplanar to each other.

20. The carpentry tool according to claim 9 wherein each leg articulates in a plane that is closely parallel to the articulating path of the other legs.

21. The carpentry tool according to claim 9 wherein the articulating joint between the first and third legs is a thumb screw.

22. The carpentry tool according to claim 9 wherein the articulating joint between the first and third legs is a wing nut.

23. The carpentry tool according to claim 9 wherein at least one leg includes indicia.

24. The carpentry tool according to claim 9, wherein one or more reinforcing bridge is included within the slot to form more than one slot along the hypotenuse leg.

25. A carpentry tool comprising:
   a generally rigid triangular member having three legs in which a first leg acting as the hypotenuse of the rigid triangular member has two oppositely-situated end portions being joined by an articulating joint to corresponding end portions of the other two adjacent second and third legs;
   end portions of the second and the third legs being joined by a latching joint capable of latching and detaching such that when the latching joint is latched, the angle between the second and third legs is substantially 90 degrees and when the latching joint is detached the end portions of the second and third legs break away from each other;
   said first leg defining a slot oriented substantially longitudinally of the first leg; and
   said articulated joint between the first and third legs being capable of tightening or loosening as well as being capable of alignment within the slot of the first leg when the joint is loosened thereby allowing the third leg to be positioned substantially anywhere along the slot and at substantially any angle relative to the first leg and to maintain that position and angle when the articulated joint between the first and third legs is tightened and the latching joint between the second and third legs is detached, wherein the latching joint consists of a spring-latch that corresponds to a notch on the adjoining leg.

26. A carpentry tool comprising:

a generally rigid triangular member capable of articulation; said member having adjoining first, second, and third legs capable of articulation relative to its adjacent leg, the first and second legs and first and third legs being adjoined therebetween by an articulating joint;

detachable latching means for latching the second and third legs end-to-end and detaching the second and third legs such that when the second and thin legs are latched end-to-end, the angle between the second and third legs is substantially 90 degrees, wherein said second and third legs have end portions containing end surfaces that confront each other when the second and third legs are adjoined via the latching means;

said first leg defining a slot oriented substantially longi-Ludinally of the first leg; and said articulated joint between the first and third legs being capable of tightening or loosening as well as being capable of alignment within the slot of the first leg when the joint is loosened thereby allowing the third leg to be positioned subsiantially anywhere along the slot and at substantially any angle relative to the first leg and to maintain that position and angle when the articulated joint between the first and third legs is tightened and the latching joint between the second and third legs is detached.

27. A method of folding a combination carpenter's square and bevel comprising:

providing a triangular-shaped combination carpenter's square and bevel tool having generally rigid adjoining first, second, and third legs with the first and second legs and first and third legs capable of articulation relative to its adjacent leg by an articulating joint, said second and third legs including end portions wherein each end portion has an end surface, and a latching joint between the second and the third legs capable of latching and detaching the end portions of the respective second and third legs such that there is surface contact between the respective second and third leg end surfaces when the joint is latched, the angle where the second and third legs join end-to-end is substantially 90 degrees, and wherein the tool comprises a slot to allow the third leg to be positioned substantially anywhere along the slot by the articulated joint between the first and third legs, wherein said articulated joint between the first and third legs is capable of tightening and loosening;

detaching the latching joint between the second and third legs thereby breaking away the connection between the second and third legs;

articulating the second leg to closely confront the first leg at the articulating joint between the first and second legs;

loosening the articulating joint between the first and third legs to bring the now joined first and second legs in clode proximity to closely confront the third leg.

28. The method according to claim 27 wherein the third leg travels upwardly against the slot of the first leg to fold the combined carpenter's square and bevel into a compact size.

29. 4 A method of folding a combination carpenter's square and bevel comprising:

providing a triangular-shaped combination carpenter's square and bevel tool having generally rigid adjoining first, second, and third legs with the first and second legs and first and third legs capable of articulation relative to its adjacent leg by an articulating joint, and a latching joint between the second and the third legs capable of latching and detaching that when the joint is latched, the angle where the second and third legs join is substantially 90 degrees, and wherein the tool comprises a slot to allow the third leg to be positioned substantially anywhere along the slot by the articulated joint between the first and third legs, wherein said articulated joint between the first and third legs is capable of tightening and loosening;

detaching the latching joint between the second and third legs thereby breaking away the connection between the second and third legs;

articulating the second leg to closely confront the first leg at the articulating joint between the first and second legs;

loosening the articulating joint between the first and third legs to bring the now joined first and second legs in close proximity to closely confront the third leg;

wherein the third leg further comprises a spacer and two opposing members in a parallel and spaced arrangement of sufficient space to accommodate an edgewise portion of the closely confronted second leg and a portion of the first leg, wherein when the second and first legs are closely confronted and the articulated joint between the first and second legs is loosened, the closely confronting second leg and a portion of the first leg fits between the two opposing members of the third leg.

30. The method according to claim 29 wherein the third leg travels upwardly against the slot of the first leg to fold the combined carpenter's square and bevel into a compact size.

* * * * *

UNITED STATES PATENT AND TRADEMARK OFFICE
CERTIFICATE OF CORRECTION

PATENT NO. : 6,662,460 B2
DATED : December 16, 2003
INVENTOR(S) : Evans

It is certified that error appears in the above-identified patent and that said Letters Patent is hereby corrected as shown below:

Column 3,
Line 43, please substitute "a" with -- α --

Column 7,
Line 43, please insert -- 26 -- after the words "third leg"

Column 10,
Line 25, please replace "accessibly" with -- accessible --

Signed and Sealed this

Twenty-eighth Day of December, 2004

JON W. DUDAS
*Director of the United States Patent and Trademark Office*